March 14, 1950        J. ROCKOFF        2,500,573
METHOD OF MAKING ROLL COVERINGS
Filed Jan. 18, 1947
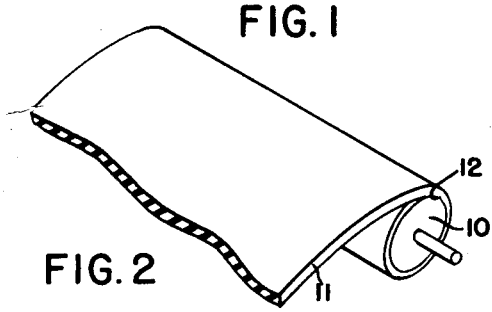
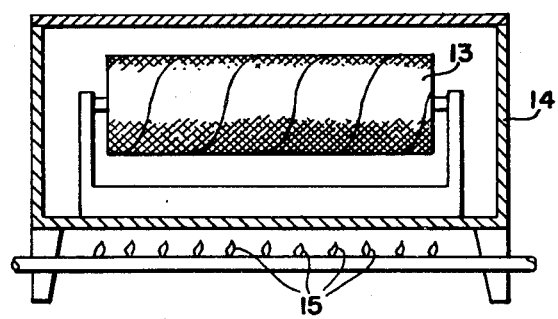
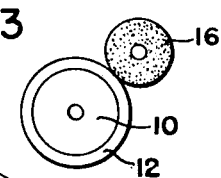
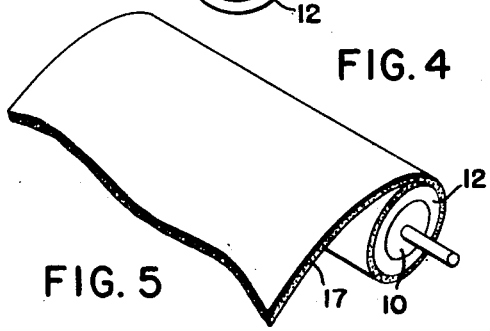
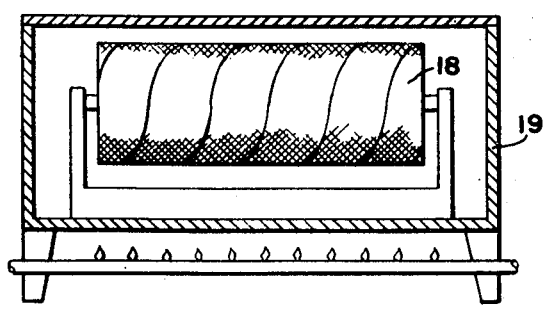
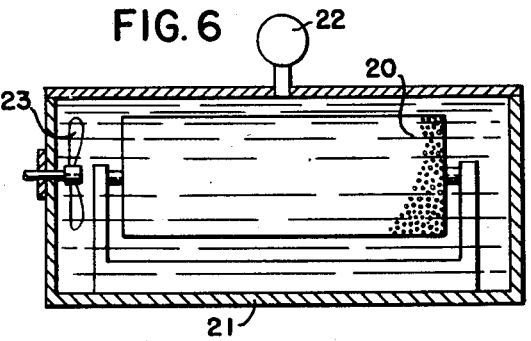
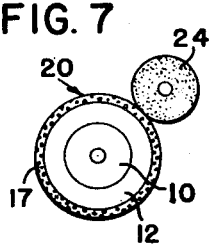
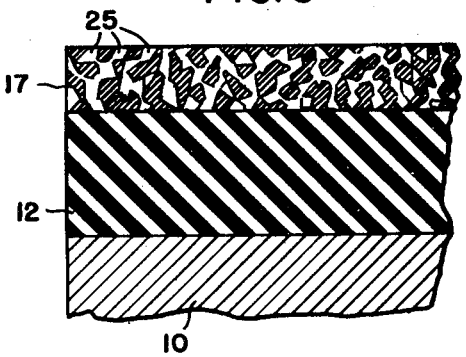
INVENTOR
JOSEPH ROCKOFF
BY
Toulmin & Toulmin
ATTORNEY Patented Mar. 14, 1950

2,500,573

UNITED STATES PATENT OFFICE 2,500,573

METHOD OF MAKING ROLL COVERINGS

Joseph Rockoff, Dayton, Ohio, assignor to The Dayton Rubber Company, a corporation of Ohio Application January 18, 1947, Serial No. 722,804

14 Claims. (Cl. 154—83)

This invention deals with a method of covering rolls, in particular rolls used for offset printing and textile machinery such as slasher rolls. Sponge rubber is used for covering such rolls, the sponge rubber providing for a good liquid control action and for a high absorptive capacity both of which are essential in the case of offset printing rolls, such as form dampers and damper ductors used on offset lithographic presses and slasher rolls.

It is an object of this invention to provide a method of covering rolls with rubber-like materials, certain parts of which consist of sponge rubber with a very fine and uniform texture.

It is another object of this invention to provide a method of manufacturing coverings of sponge rubber for rolls by which the size and the number of pores therein may be controlled easily.

It is another object of this invention to provide a process for manufacturing coverings for rolls which, in spite of their high degree of porosity, are of considerable stability and rigidity so that deformation during operation does not occur.

It is still another object of this invention to provide a process for manufacturing coverings for rolls which have a high absorptive capacity for liquids.

It is still another object of this invention to provide a method for manufacturing coverings for slasher rolls with which the amount of sizing material on the yarn may be controlled easily and with accuracy.

It is still another object of this invention to provide a method of making coverings for rolls from sponge rubber which may be thoroughly cleaned without difficulty.

These and other objects are accomplished by applying a layer of solid rubber or rubberlike material onto a mandrel, placing a thinner layer of rubber mixed with salt crystals thereover, curing the assembly thus obtained and then removing the salt crystals from said top layer.

The invention will be more fully understood from the following description taken in connection with the accompanying drawings, in which Figure 1 is a perspective view of the winding of a base layer on a mandrel during the first step of the process of my invention;

Figure 2 is a sectional view diagrammatically illustrating the second step of the process of my invention;

Figure 3 is a diagrammatic sectional view illustrating the third step of the process of my invention;

Figure 4 is a perspective view illustrating the fourth step of the process of my invention;

Figure 5 is a diagrammatic sectional view showing the next step of the process of my invention;

Figure 6 is a diagrammatic sectional view showing a further step of the process of my invention;

Figure 7 is a cross-sectional diagrammatic view of still a further step of the process of my invention; and Figure 8 is a fragmentary sectional view of the finished product.

Referring to the drawings in detail, the reference numeral 10 indicates a mandrel around which sheet rubber 11 is wrapped to build up an inner bulk layer 12 (Fig. 1). The mandrel, which consists preferably of metal, has been cleaned prior to its use. It also may have been provided with a thin coating of a rubber bonding cement; however, this step is not obligatory for the operativeness of my invention. Thereafter the mandrel with the rubber layers is wrapped in a damp cloth and vulcanized. This step is illustrated in Figure 2 where the wet cloth is designated with the reference numeral 13; 14 is a curing oven heated by burners 15. The vulcanized unit is then, after cooling, ground (Fig. 3) for the purpose of roughening its surface and thus provide a more intense bond with the following layer. In the drawing, a grinding wheel is indicated by the numeral 16.

The unit is now equipped with a thin outer sponge layer. For this purpose a single calendered sheet 17 (Fig. 4) comprising a salt-rubber mixture is wound over the bulk layer 12 which may have been, but does not have to be, provided with a surface coat of rubber cement. The built-up unit is then again wrapped in a damp cloth 18 and vulcanized in an oven 19 (Fig. 5).

Thereafter the salt is removed from the top layer in order to create pores therein. For this purpose the unit 20 (Fig. 6) is introduced into a leaching chamber 21 which is charged with water from a source indicated by 22. A stirrer 23 provides for agitation of the water. After the water has reached a salt concentration when the efficency for further use becomes noticeably impaired, it is replaced by fresh water. However, the water may also be supplied in a continuous flow.

Figure 7 illustrates the step of surface-conditioning the sponge layer. There, the sponge layer 17 of the unit 20 is ground with a wheel 24.

Figure 8 shows an enlarged section of a part of the finished covering. It is obvious that the inner bulk layer 12 consists of solid rubberlike material, whereas the surface layer 17 has a great number of minute pores 25 uniformly distributed therein. These pores are interconnected whereby they form channel-like holes which extend throughout the entire surface layer 17.

This feature of the pores being interconnected is of the utmost importance, since by this the efficiency of the roll covering is greatly enhanced. Even the pores located at the innermost layer of the sponge section are accessible to the material to be treated and consequently the absorptive capacity of the entire unit is increased.

The step of leaching out the salt crystals is preferably—though not necessarily—carried out under pressure, for example under a pressure of approximately 200 lbs. per square inch.

In order to obtain, after leaching, pores that are interconnected and thus to make possible that the surface layer in its entire thickness may be utilized, a relatively great amount of salt crystals is incorporated into said surface layer. It is evident that the degree of porosity may be adjusted by merely varying the amount of salt added. I have obtained very satisfactory results with 200 to 300 parts by weight of salt per 100 parts of rubber or rubberlike material, but it will be understood that the particular proportions of salt and rubber are widely variable depending upon the texture desired.

Instead of grinding the sponge surface after leaching, the salt crystals may also be removed after the covering has been surface-conditioned by grinding. In the former case it is advantageous, though not obligatory, to dry the unit prior to grinding.

The rubber of the bulk layer and the rubber-salt mixture may be applied to the mandrel by any method known to those skilled in the art. Knifing, immersion, spraying and others were found to be applicable means therefor.

Various kinds of rubber materials are usable for the object of my invention. Natural as well as synthetic rubbers are operative, the selection being dependent upon the use intended for the covering. Synthetic rubbers which were found satisfactory for my purpose are the neoprenes, butadiene copolymers, such as butadiene acrylonitrile copolymer and butadiene styrene copolymer, and the polysulfide rubbers known under the trade-name Thiokol. Filler materials, vulcanizing agents and other auxiliary substances known may be added to the rubber materials.

As the pore-creating salt, any water soluble salt is usable which does not decompose or disintegrate at the vulcanization temperature. For instance, sodium chloride, various kinds of sulfates, sugar and others obvious to those skilled in the art may be used.

It will be understood that the thickness of the outer sponge layer is dependent upon the size of the covering and upon the purpose for which it is intended. In the case of slasher rolls, a thickness of the finished outer layer of $1/32$ to $3/64$ of an inch was the thickness preferred, while a thickness of from 1 to 2 inches was preferred for the inner solid bulk layer. Similarly the hardness of the material also has to be adjusted according to the purpose intended. A hardness of from 40 to 60 on the Shore scale A was found the optimal range for slasher rolls.

It will be obvious that by the specific method of preparing the sponge rubber layer on the coverings of my invention an article is obtained which has an extremely uniform texture and in which the holes are interconnected. These interconnected holes or pores form channel-like voids which have a considerably higher suction than have small individual pores; as a result thereof, a higher gripping action and a greater absorbability are obtained. Due to the inner solid bulk layer, the rigidity and form-stability of the covering are considerably greater than if it were made entirely of sponge rubber. This feature of having only the outer layer made of sponge rubber facilitates cleaning of the channels in case this should become necessary, since the innermost ends of the channels are better accessible to the cleaning means. Furthermore, due to the uniform size and distribution of the cavities, the operation of the covering is more uniform at its various locations.

Instead of producing the outer sponge layer from a rubber-salt mixture, latex foam sponge may also be employed for the purpose. In this case air is beaten into a vulcanizable latex composition to form a froth, the froth is applied to the bulk layer and then vulcanized whereby it is bonded to the bulk layer.

It will be understood that although a number of uses for the articles of my invention have been set forth, these represent merely examples, since there are a great many other possibilities for which the invention is, or might become, of value.

It will also be understood that while there have been described herein certain specific embodiments of my invention, it is not intended thereby to have it limited to or circumscribed by the specific details given in view of the fact that this invention is susceptible to various modifications and changes which come within the spirit of this disclosure and the scope of the appended claims.

I claim:

1. A method of manufacturing roll coverings comprising the steps of (a) applying a bulk layer of rubber material to a mandrel; (b) vulcanizing said layer; (c) placing a relatively thin sponge-texture forming rubber composition thereover as a surface layer; and (d) curing the unit thus formed.

2. A method of manufacturing roll coverings comprising the steps of (a) applying a bulk layer of rubber material to a mandrel; (b) vulcanizing said bulk layer; (c) placing a mixture of crystals of water soluble material and rubber material thereover to form a relatively thin surface layer; (d) curing the unit thus formed; and (e) removing all of said crystals from said surface layer by solution in water whereby channel-like voids are formed throughout its entire thickness.

3. A method of manufacturing roll coverings comprising the steps of (a) applying a bulk layer of rubber material to a mandrel; (b) vulcanizing said layer; (c) placing a mixture of crystals of a water soluble salt and rubber material thereover to form a relatively thin surface layer; (d) wrapping the unit thus formed in a wet cloth; (e) curing said wrapped unit; and (f) removing all of said salt crystals by solution in water whereby channel-like voids are formed throughout the entire thickness of said surface layer.

4. A method of manufacturing roll coverings comprising the steps of (a) applying a bulk layer of rubber material to a mandrel; (b) vulcanizing said layer; (c) placing a mixture of sodium chloride crystals and rubber material thereover to form a relatively thin surface layer; (d) curing the unit thus formed; and (e) removing all of said crystals from said surface layer by leaching whereby channel-like voids are formed throughout its entire thickness.

5. A method of manufacturing roll coverings comprising the steps of (a) applying a bulk layer of rubberlike material to a mandrel; (b) vulcanizing said layer on said mandrel; (c) placing a layer of latex froth thereover; and (d) vulcanizing said froth layer whereby said two layers are integrally united.

6. A method of manufacturing roll coverings comprising the steps of (a) applying a bulk layer of rubber material having a thickness of from about 1 to 2 inches to a mandrel; (b) vulcanizing said layer; (c) placing a mixture of water soluble crystals and rubber material thereover to form a relatively thin surface layer having a thickness of about 1/32 to 3/64 of an inch; (d) wrapping said unit thus formed in a wet cloth; (e) vulcanizing said unit; (f) leaching out all of said salt crystals from said surface layer whereby channel-like voids are formed throughout its entire thickness; and (g) grinding the surface of said unit.

7. A method of manufacturing roll coverings comprising the steps of (a) applying a bulk layer of rubber material to a mandrel; (b) vulcanizing said layers; (c) grinding the surface of said layer; (d) placing a mixture of water soluble crystals and rubber material thereover to form a relatively thin surface layer; (e) curing the unit thus formed; and (f) leaching out all of said crystals from said surface layer while applying pressure whereby channel-like voids are formed throughout the entire thickness of said surface layer.

8. A method of manufacturing roll coverings comprising the steps of (a) applying a bulk layer of rubber material to a mandrel; (b) vulcanizing said layer; (c) placing a mixture of water soluble crystals and rubber material thereover to form a relatively thin surface layer; (d) curing the unit thus formed; and (e) leaching out all of said crystals from said surface layer while applying a pressure of approximately 200 p. s. i. whereby channel-like voids are formed throughout the entire thickness of said surface layer.

9. A method of manufacturing roll coverings comprising the steps of (a) applying a bulk layer of rubber material to a mandrel; (b) vulcanizing said layer; (c) placing a mixture of water soluble crystals and rubber material thereover to form a relatively thin surface layer; (d) wrapping said units thus formed in a wet cloth; (e) vulcanizing said unit; (f) grinding said unit to the precise size and surface condition desired; and (g) leaching out all of said crystals from said surface layer whereby channel-like voids are formed throughout its entire thickness.

10. A method of manufacturing roll coverings comprising the steps of (a) applying a bulk layer of rubber material having a thickness of from about 1 to 2 inches to a mandrel; (b) vulcanizing said layer; (c) placing a mixture of water soluble crystals and rubber material thereover to form a relatively thin surface layer having a thickness of about 1/32 to 3/64 of an inch; (d) wrapping said unit thus formed in a wet cloth; (e) vulcanizing said unit; (f) grinding said unit to the precise size and surface condition desired; (g) leaching out all of said crystals from said surface layer whereby channel-like voids are formed throughout its entire thickness; and (h) drying said unit.

11. A method of manufacturing roll coverings comprising the steps of (a) applying a bulk layer of rubber material to a mandrel; (b) vulcanizing said layer; (c) placing a mixture of a water soluble salt and rubber material in the proportion of 200 to 300 lbs. of salt per 100 lbs. of rubber material thereon to form a relatively thin surface layer; (d) curing the unit thus formed; and (e) removing all of said salt crystals from said surface layer by leaching whereby channel-like voids are formed throughout its entire thickness.

12. A method of manufacturing roll coverings comprising the steps of (a) applying a bulk layer of neoprene material to a mandrel; (b) curing said layer; (c) placing a mixture of a water soluble salt and neoprene material in the proportion of 200 to 300 lbs. of salt per 100 lbs. of neoprene thereon to form a relatively thin surface layer; (d) curing the unit thus formed; and (e) removing all of said salt crystals from said surface layer by leaching whereby channel-like voids are formed throughout its entire thickness.

13. A method of manufacturing roll coverings comprising the steps of (a) applying a bulk layer of rubbery butadiene copolymer material to a mandrel; (b) vulcanizing said layer; (c) placing a mixture of a water soluble salt and rubbery butadiene copolymer material in the proportion of 200 to 300 lbs. of salt per 100 lbs. of rubbery butadiene copolymer thereon to form a relatively thin surface layer; (d) curing the unit thus formed; and (e) removing all of said salt crystals from said surface layer by leaching whereby channel-like voids are formed throughout the entire thickness of said surface layer.

14. A method of manufacturing roll coverings comprising the steps of (a) applying a bulk layer of polysulfide rubber material to a mandrel; (b) vulcanizing said layer; (c) placing a mixture of a water soluble salt and polysulfide rubber material in the proportion of 200 to 300 lbs. of salt per 100 lbs. of polysulfide rubber thereon to form a relatively thin surface layer; (d) curing the unit thus formed; and (e) removing all of said salt crystals from said surface layer by leaching whereby channel-like voids are formed throughout the entire thickness of said surface layer.

JOSEPH ROCKOFF.

REFERENCES CITED

The following references are of record in the file of this patent:

UNITED STATES PATENTS

| Number | Name | Date |
| --- | --- | --- |
| 1,370,709 | Smith | Mar. 8, 1921 |
| 1,659,371 | Merrill | Feb. 14, 1928 |
| 1,963,856 | Lewis et al. | June 19, 1934 |
| 2,006,364 | Morse | July 2, 1935 |
| 2,185,738 | Rockoff | Jan. 2, 1940 |
| 2,263,285 | Bolog | Nov. 18, 1941 |
| 2,271,124 | Juve et al. | Jan. 27, 1942 |
| 2,332,514 | Holtzclaw | Oct. 26, 1943 |
| 2,353,877 | Chollar | July 18, 1944 |